United States Patent
Fortell et al.

(10) Patent No.: US 7,620,478 B2
(45) Date of Patent: Nov. 17, 2009

(54) CONTROL SYSTEM, METHOD AND COMPUTER PROGRAM FOR SYNCHRONIZING SEVERAL ROBOTS

(75) Inventors: Håkan Fortell, Västerås (SE);
Sven-Erik Johansson, Västerås (SE);
Sven-Erik Lindström, Västerås (SE)

(73) Assignee: ABB AB, Västerås (SE)

( * ) Notice: Subject to any disclaimer, the term of this patent is extended or adjusted under 35 U.S.C. 154(b) by 358 days.

(21) Appl. No.: 10/585,726

(22) PCT Filed: Jan. 14, 2005

(86) PCT No.: PCT/SE2005/000043

§ 371 (c)(1),
(2), (4) Date: Jul. 12, 2006

(87) PCT Pub. No.: WO2005/068138

PCT Pub. Date: Jul. 28, 2005

(65) Prior Publication Data

US 2008/0234861 A1 Sep. 25, 2008

(30) Foreign Application Priority Data

Jan. 16, 2004 (SE) .................................... 0400091

(51) Int. Cl.
*G05B 19/04* (2006.01)
*G05B 19/418* (2006.01)

(52) U.S. Cl. ........................ 700/247; 700/114; 700/169; 700/248; 700/255; 900/8; 318/568.11

(58) Field of Classification Search ...................... 901/1, 901/8; 700/60, 61, 114, 247, 248, 249, 252; 318/568.11, 568.12, 568.15

See application file for complete search history.

(56) References Cited

U.S. PATENT DOCUMENTS 5,243,266 A * 9/1993 Kasagami et al. ........ 318/568.1

(Continued)

FOREIGN PATENT DOCUMENTS

EP 0377939 A1 7/1990

(Continued)

OTHER PUBLICATIONS

PCT/ISA/210—International Search Report.

*Primary Examiner*—Thomas G Black
*Assistant Examiner*—Lin B Olsen
(74) *Attorney, Agent, or Firm*—Venable LLP; Eric J. Franklin

(57) ABSTRACT

A control system for controlling the movements of a plurality of mechanical units. The control system includes a program that includes a plurality of mechanical unit programs. Each program includes movement instructions for at least one of the mechanical units. The control system also includes a plurality of path planners. At least one of the path planners is adapted to receive instructions from more than one of the mechanical unit programs and on basis thereof determine how the mechanical units should move in order to synchronize their movements. The control system further includes switches adapted to switch a mechanical unit program from one path planner to another, whereby the movements of the mechanical units are synchronized when their mechanical unit programs are connected to the same path planner and the movements of the mechanical units are independent when their mechanical unit programs are connected to different path planners.

14 Claims, 1 Drawing Sheet

U.S. PATENT DOCUMENTS

| | | | | |
|---|---|---|---|---|
| 5,254,923 A | * | 10/1993 | Kanitani | 318/568.11 |
| 5,889,924 A | * | 3/1999 | Okabayashi et al. | 700/245 |
| 6,004,019 A | * | 12/1999 | Suita et al. | 700/212 |
| 6,804,580 B1 | * | 10/2004 | Stoddard et al. | 700/245 |
| 7,010,390 B2 | * | 3/2006 | Graf et al. | 700/248 |
| 7,069,112 B2 | * | 6/2006 | Graf | 700/248 |
| 7,211,978 B2 | * | 5/2007 | Chang et al. | 318/568.11 |
| 2003/0220715 A1 | * | 11/2003 | Kneifel et al. | 700/245 |
| 2004/0030452 A1 | * | 2/2004 | Graf et al. | 700/245 |
| 2006/0200254 A1 | * | 9/2006 | Krause | 700/20 |

FOREIGN PATENT DOCUMENTS

| | | |
|---|---|---|
| EP | 1090722 A2 | 4/2001 |
| EP | 1090722 A2 * | 4/2001 |
| EP | 1464452 A2 | 10/2004 |
| WO | WO 03103903 A1 | 12/2003 |

* cited by examiner

CONTROL SYSTEM, METHOD AND COMPUTER PROGRAM FOR SYNCHRONIZING SEVERAL ROBOTS

CROSS-REFERENCE TO RELATED APPLICATIONS

This application claims priority to Swedish patent application 0400091-5 filed 16 Jan. 2004 and is the national phase under 35 U.S.C. § 371 of PCT/SE2005/000043.

TECHNICAL FIELD OF THE INVENTION

The present invention concerns a control system for controlling the movements of a plurality of mechanical units, namely robots and external axes, such as workstations or transport tracks.

The present invention also concerns a method for controlling a plurality of mechanical units and a computer program containing computer program code means for making a computer or processor execute the steps of such a method.

PRIOR ART

An industrial robot includes a manipulator and a control system having means for operating the manipulator. The control system comprises a storage unit for storing one or more control programs for controlling the movement of the manipulator. The control program comprises program instructions, including movement instructions for the manipulator. The control system further comprises a program executer for executing the control programs and to provide instructions based on said movement instructions, and a path planner adapted to receive said instructions from the program executer and on basis thereof determine how the manipulator should move in order to be able to execute the movement instructions. The path planner plans how the instructed movement should be performed by carrying out an interpolation of the movement. The interpolation includes dividing the instructed movement into a plurality of small increments, and computing the joint angles for all axis of the robot for each increment. The joint angels are then converted into motor references. The path planner transmits the computed motor references to one or more drive modules, such as servomechanisms, to drive the manipulator in accordance with the movement instructions.

Many industrial plants utilize systems comprising a plurality of mechanical units, such as a multiple robot system or a system comprising one robot that cooperates with one or more external axes. In many applications it is a desire that the mechanical units perform mutually coordinated, i.e. synchronous movements.

For this purpose it is known to have a single general control program for controlling the mechanical units to perform synchronous movements. The single general control program comprises program instructions, including movement instructions for all of the mechanical units. The mechanical units are connected to a control system comprising a program executer for executing the single general control program, and a path planner for determining how the mechanical units should move in order to be able to execute the movement instructions of the control program.

European patent application nr 89309635.4 discloses a robot control system for controlling a set of industrial robots for coordinated, cooperative operation in accordance with a single general control program. The single general control program comprises movement instructions for the set of industrial robots. The control system comprises a single reading/compiling unit for separately reading the movement instructions from the storage unit and extracting the movement instructions for each industrial robot.

When running such a program for multiple mechanical units it is however sometimes necessary to interrupt the program and move, or jog, one robot independently of the other robots in order to perform maintenance or repair work, for example when the nozzle of a spray or welding gun held by a robot needs to be cleaned or replaced. When the maintenance or repair work has been carried out the robot that was moved independently must then be brought back into exactly the same position and it must regain exactly the same status as it had prior to being moved independently, i.e. it must be returned to the same path level, so that it can continue to work synchronously with the other robots.

If movement instructions are provided by a single general control program, moving one robot independently of the other robots becomes impossible. Such a single general control program also has to be rewritten every time the work, or the mechanical units of a system are changed, for example when a robot is added to the system.

A known solution to this problem is to have a separate control program for controlling each mechanical unit, and to connect each mechanical unit to a separate control system comprising a path planner, which plans the movement of the connected mechanical unit. In order to carry out synchronization of the mechanical units, the separate control programs are executed at the same time. The control systems are connected for communication with each other. For the purpose of synchronizing the movements, one of the mechanical units is selected as a master and the other mechanical units are selected as slaves. The path planner of the master unit interpolates the movements and then transmits position data and interpolation data to the slaves. The path planner of the slave units interpolates the movements of the connected mechanical unit based on data received from the master unit. To be able to switch between synchronized and independent movements of the mechanical units, the control programs of the cooperating mechanical units contain specific synchronization instructions, which are translated by an interpreter program translating the control program into specific machine instructions, and there are then specific method sequences for synchronizing the corresponding mechanical units. A system using a master slave concept is for example disclosed in European patent application no. EP 1 090 722.

The master-slave concept shows a plurality of disadvantages. One disadvantage is that the accuracy of the synchronization is significantly reduced due to delays in the transmission of data from the master to the slaves, and due to the fact that each movement is planned separately without considering possible limitations of the other mechanical units. To maintain a high accuracy of the synchronization in a master-slave concept, the speed of the synchronized mechanical units must be reduced. However, in many applications high speed is demanded.

The mechanical units are usually programmed to execute a plurality of tasks. Certain tasks require two or more of the mechanical units to move synchronously whereby the movement instructions in separate mechanical-unit-programs are executed at the same time in order to coordinate the movements of the mechanical units. During a coordinated task, when one of the mechanical units, or part of a mechanical unit, such as a manipulator arm, is displaced or rotated, this displaces or rotates the coordinate system in which the other mechanical units work. It is important to know exactly how the coordinate system has been displaced or rotated so that other mechanical units can be directed to the programmed positions.

SUMMARY OF THE INVENTION

The object of the present invention is to provide an improved control system for a plurality of mechanical units, which enables the mechanical units to be operated individually as well as in synchronous cooperation.

This object is achieved by means of the initially defined control system, characterized in that the control system comprises: a program means comprising a plurality of mechanical unit programs, each comprising program instructions including movement instructions for at least one of said mechanical units, a plurality of path planners, each path planner adapted to receive instructions from at least one of said mechanical unit programs and on basis thereof determine how the mechanical unit should move in order to be able to execute the movement instruction, wherein at least one of said path planners is adapted to receive instructions from at least two of said mechanical unit programs and on basis thereof determine how the mechanical units should move in order to synchronize their movements, and switching means adapted to switch a mechanical unit program from one path planner to another, whereby the movements of the mechanical units are synchronized when their mechanical unit programs are connected to the same path planner and the movements of the mechanical units are independent when their mechanical unit programs are connected to different path planners.

A mechanical-unit-program is a control program including instructions for controlling one or more mechanical units. The control system is adapted for storing a plurality of mechanical-unit-programs and for executing the programs in parallel. For the control system to be able to handle this, it comprises a plurality of path planners, which create motor references from programmed positions. The movements of a plurality of mechanical units are synchronised when their mechanical-unit-programs are connected to the same path planner and are independent when connected to different path planners.

The control system comprises means to switch at least one mechanical-unit-program from one path planner to another. By switching a mechanical-unit-program from a first path planner to a second path planner the mechanical unit is able to switch between independent movement and synchronised movement. The movements of two or more mechanical units are operated in synchronous cooperation by connecting their mechanical-unit-programs to the same path planner, and the mechanical units are operated individually by connecting them to different path planners. Due to the fact that the synchronization status is local to each of the involved path levels, the mechanical unit takes up the same position and status as when its program was switched from the first path planner to the second path planner.

Thanks to the fact that the mechanical-unit programs to be synchronized are connected to the same path planner, the path planner is able to perform a parallel interpolation of the movements of the mechanical units to be synchronized and thus the aforementioned delays of the master-slave concept are avoided. Another advantage gained with connecting the mechanical-unit programs to be synchronized to the same path planner, is that it makes it possible for the path planner to consider limitations, such as current, torque, and motor speed, for all axis of the mechanical units to be synchronized. Thus, the accuracy of the synchronization is increased and accordingly it is possible to increase the speed of the synchronized movement.

The expression "movement of a mechanical unit" is intended to mean not only displacement of whole or part of a mechanical unit but also includes changing the orientation of whole or part of a mechanical unit.

According to a preferred embodiment of the invention each mechanical unit program is connected to one of said path planners, and said switching means is adapted to upon command disconnect the mechanical unit program from the connected path planner and to connect the mechanical unit program to another path planner. As long as there is no synchronization command, each mechanical-unit-program is connected to a different path planner, which means that the mechanical units are operated individually. Upon detecting one or more synchronization commands, and based on available synchronization information, the switching means disconnects the mechanical unit program/programs from the connected path planner/planners and connects the mechanical unit program/programs to another path planner. The synchronization commands are for example provided in the mechanical-unit program. Each mechanical-unit-program is connected to one of the path planners at a time, i.e. each mechanical-unit program is connected to only one path planner at any given time.

According to an embodiment of the invention the control system comprises a central data storage means and at least one mechanical unit is arranged to transmit data concerning its position, such as robot arm position, its joint angles or the orientation of a tool mounted on the robot, and/or status, i.e. operating state, to the central data storage means. The position data is given either as an absolute position with reference to a world coordinate system for example, or a relative position with respect to the mechanical unit's previous position. This embodiment enables easy access to information concerning the mechanical units in the system so that the other mechanical units in the system knows exactly what the other mechanical units are doing.

This means that the information concerning the position and status of at least one, or all of the mechanical units or parts thereof, is easily accessible and that it is possible to see which program and/or which part of a program a mechanical unit is executing. The control system therefore provides updated information on the position and status at least one or all of the mechanical units on request from a mechanical-unit-program, a path planner or an operator who is monitoring the system or who is programming one of the system's mechanical units. A mechanical-unit-program does not therefore have to be modified when one of the mechanical units moves. Such a system enables a robot to find an object located on a stationary manipulator, for example, even if the manipulator's location has changed since the robot's program was written. Furthermore, the position and status data for every mechanical unit is accessible by every other mechanical unit in the system so each mechanical unit can find out exactly what the other mechanical units are doing even if all of the mechanical units are running independently.

According to a preferred embodiment of the invention said at least one mechanical unit is arranged to transmit position and/or status data to the central data storage means when it is stationary i.e. when it has stopped moving and/or while it is moving to a new location. According to another preferred embodiment of the invention said position data comprises information concerning the displacement and/or rotation of said at least one mechanical unit's coordinate system.

According to a further preferred embodiment of the invention the central data storage means is arranged so that data stored therein is accessible by an operator, a mechanical-unit program or the path planning means. According to a yet further preferred embodiment of the invention the central data storage means is arranged so that data stored therein is accessible locally and/or remotely via a network such as the Internet.

The present invention also concerns the method for controlling a plurality of mechanical units.

The method comprises connecting a plurality of mechanical-unit-programs to the same path planner in order to synchronise the movements of the plurality of mechanical units and connecting a plurality of mechanical-unit-programs to different path planners if the corresponding mechanical units are to move independently of one another.

According to a preferred embodiment of the invention the method comprises connecting each mechanical unit program to one of said path planners, and upon command disconnecting at least one of the mechanical unit programs from the connected path planner and to connect the mechanical unit program to another path planner.

According to a preferred embodiment of the invention the method comprises comprising storing position and/or status data from at least one of the plurality of mechanical units in a central data storage means.

The present invention also concerns a computer program containing computer program code means for making a computer or processor execute the steps of a method according to any of the preferred embodiments of the invention and such a computer program stored by means of a computer-readable medium.

The control system, method and computer program according to the present invention is intended for use in any system comprising a plurality of mechanical units, namely robots and/or external axes, which are programmed to execute at least one task where at least two of said mechanical units move synchronously. The present invention is equally applicable to systems comprising mechanical units that are mounted on stationary bases as it is to systems comprising mechanical units that are mounted on mobile bases.

Further advantages as well as advantageous features of the invention appear from the following description.

The following description and drawings are not intended to limit the present invention to the embodiment disclosed. The embodiment disclosed merely exemplifies the principles of the present invention.

DETAILED DESCRIPTION OF A PREFERRED EMBODIMENT OF THE INVENTION

Figure 1:
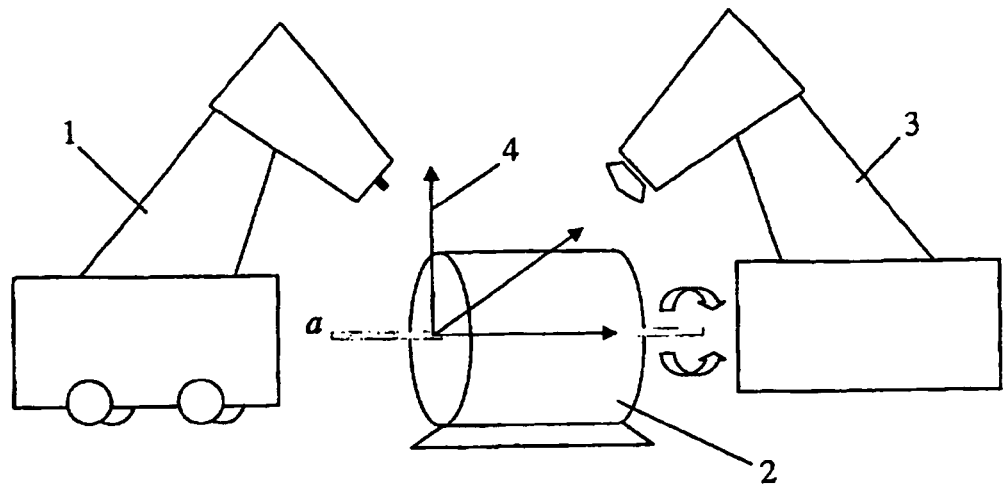
FIG. 1 shows a schematic diagram of a two-robot system to which the present invention is applicable.

FIG. 1 shows a two-robot system comprising two robots 1, 3 and an external axis 2, such as a workstation that conveys and positions workpieces mounted thereon. The external axis 2 rotates about an axis, a. Robot 1 is a welding robot mounted on a mobile base. Mounting a robot on a mobile base extends the reach of the robot arm and increases the size of the robot workspace. The additional degrees of freedom in the mobility of the mechanical unit are however not a problem if a control system according to the present invention is used to control the mobile mechanical unit. The additional degrees of freedom are in fact turned to advantage by using them to accomplish additional tasks specified by an operator.

Robot 3 is mounted on a stationary base and comprises a tool, such as a welding gun, mounted on the robot to execute specified work on workpieces mounted on the rotatable external axis 2. The workpieces on the external axis 2 are moved during the welding and their location is expressed in the robot programs using the coordinate system 4 of the external axis 2. As the external axis 2 rotates, its coordinate system 4 rotates correspondingly.

The system comprises sensor means on axis, a, to measure the rotation of the external axis 2 and means to transmit this information to a central data storage means in the control system of the two-robot system. The coordinates given in the robot's programs are therefore updated when the robot's path planners require such information by reference to the central data storage means. Robots 1, 3 are therefore able to move to the programmed positions and execute each programmed task accurately as the tools held by the robots will have the right orientation and they will be guided to the right place on the workpiece to be welded.

Figure 2:
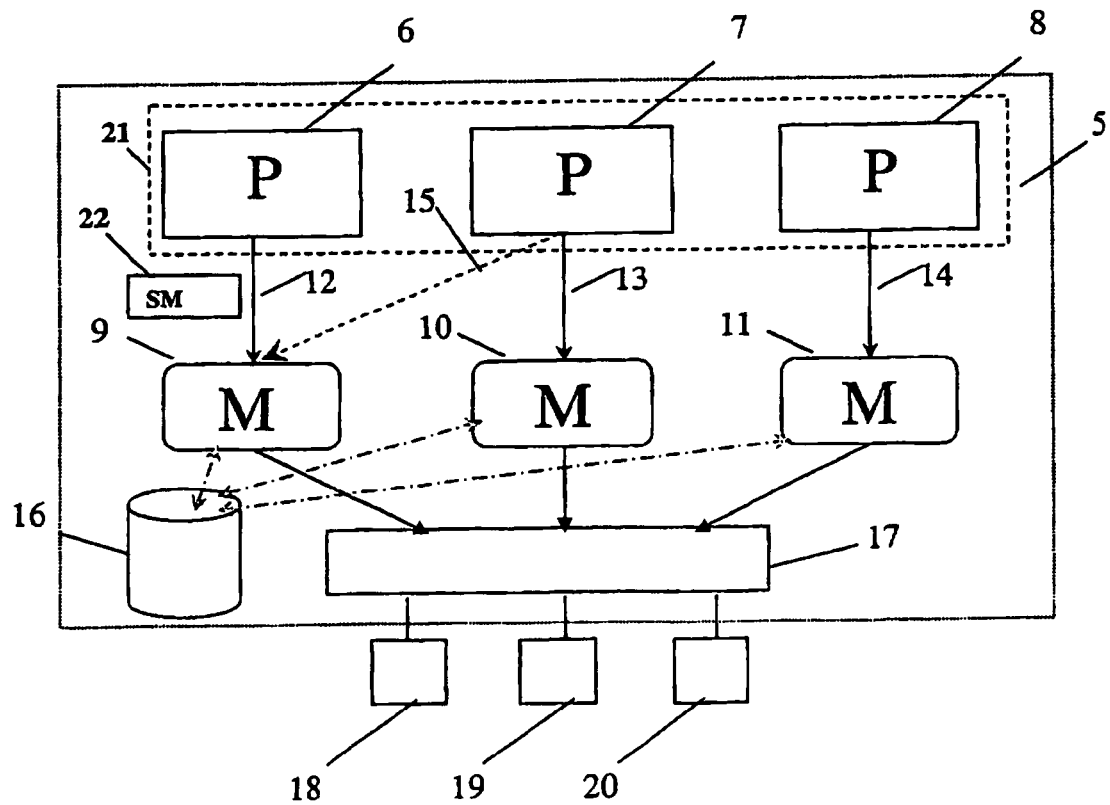
FIG. 2 shows a block diagram of a control system according to a preferred embodiment of the invention.

FIG. 2 shows a control system 5 installed on a computer. The control system 5 controls a three-mechanical-unit system, such as the system shown in FIG. 1, comprising two robots 1, 3 and an external axis 2. The control system 5 comprises a program storage 21 for storage of a plurality of mechanical unit programs (6, 7, 8), each comprising program instructions including movement instructions for one of the mechanical units (1, 2, 3). The control system 5 further comprises a plurality of program executers (not shown) adapted to run said mechanical unit programs in parallel, and to provide instructions, based on said movement instructions, and a plurality of path planners (9, 10, 11) adapted to receive said instructions from the program executers and on basis thereof determine how the mechanical unit should move in order to be able to execute the movement instructions. In this embodiment all of the path planners are adapted to receive instructions from a plurality of program executers and on basis thereof determine how the mechanical units should move in order to synchronize their movements. Each of the path planners is adapted to perform a parallel interpolation of the movements of the mechanical units to be synchronized.

The control system comprises one program executer and one path planner for each mechanical unit to be controlled by the system. Each program executer is connected to one of the path planners, which means that the instructions from the program executer are sent to the connected path planner. The control system comprises switching means 22 adapted to upon command disconnect a program executer from a path planner and, and instead connect the program executer to another path planner. This means that the instructions from the program executer are redirected from the first path planner to the second path planner. The movements of the mechanical units are synchronized when instructions from the program executers are directed to the same path planner and the movements of the mechanical units are independent when the instructions from the program executers are directed to different path planners.

Further, the control system comprises storage means 16 for storing information about which mechanical units to be synchronized and which path planner to be used for determining the synchronized movements. The switching means 22 is adapted to redirect the instructions based on said stored information. The switching means 22 is adapted to receive synchronization commands from the program executers, and upon receiving at least one synchronization command redirecting the instructions to another path planner. The program executer sends the synchronization command upon detecting a synchronization instruction in the program code of the mechanical unit program.

The switching means 22 is adapted to, based on the information about which units to be synchronized, wait until synchronization commands have been received from all of the program executers which run robot programs for the mechanical units to be synchronized, and then redirect the instructions from the program executers, which run robot programs for the mechanical units to be synchronized, to the same path planner. The switching means 22 is adapted to send information about completion of the redirection to the program executers, which run robot programs for the mechanical units to be synchronized, and the program executers are adapted to, upon receiving thereof, execute the next program instruction in the robot program.

The control system 5 comprises three mechanical-unit programs 6, 7, 8, containing instructions such as "STOP", "START" and "WAIT" and also movement instructions such as "MOVE TO" for each mechanical unit. The control system 5 also comprises a plurality of program planners 9,10,11 that tell at least one mechanical unit how to move in order to be able to execute a programmed task.

Each mechanical-unit-program 6, 7, 8 is connected to only one path planner 9, 10, 11, at any given time. Arrows 12, 13, 14 in FIG. 2 show that each mechanical-unit-program 6, 7, 8, is connected to a different path planner 9, 10, 11, so when the mechanical-unit-programs are run, each mechanical unit will move independently. The control system 5 comprises means to switch the mechanical units from independent to synchronised movement. If the mechanical-unit-programs 6 and 7 are to be synchronised, the control system disconnects mechanical-unit-program 7 from path planner 10 and connects program 7 to path planner 9. When mechanical-unit-programs 6 and 7 need to be synchronised, they are both connected to path planner 9 as indicated by arrows 12 and 15 in FIG. 2.

In the two-robot system shown in FIG. 1 the welding robot 1 is programmed to execute at least one task where its movements are synchronized with the movements of the rotatable external axis 2. The welding robot, 1, may however need to be moved independently of the rotatable external axis 2, for maintenance work such as unblocking the nozzle of the welding gun held by the robot. The corresponding robot programs are therefore interrupted and robot 1's program is connected to a different path planner to enable it to move independently of the rotatable external axis 2.

Once the maintenance work has been completed robot 1 is moved back into position, its program is re-connected to the same path planner as external axis 2 and the programs of robot 1 and the external axis 2 are re-started.

The path planners 9, 10, 11, communicate with a central data storage means 16 that contains position and status data transmitted from each of the three mechanical units. The message exchanging, or communication, between the path planners and the central data storage means is indicated by double-headed arrows in FIG. 2. In this way the path planners 9,10,11 receive updated information on whether, and how, the three mechanical units have moved as well as about the status of the mechanical units. If a mechanical unit has been displaced and/or rotated then the path planner calculates the position and/or orientation of that mechanical unit's coordinate system before providing movement instructions for a mechanical unit working in that coordinate system.

Movement instructions are then transmitted to drive modules 18, 19, 20 associated with each mechanical unit via a main computer interface 17 so that the corresponding mechanical units are able to move to the programmed positions and execute a programmed task.

Although the embodiments disclosed describe a three-mechanical-unit-system, the control system according to the present invention can be used to control any number of mechanical units from a single controller. Addition of a mechanical unit to a particular system requires only the addition of a configuration file into the inventive control system.

The control system comprises the hardware necessary for carrying out the invention, such as one or more processing units, input and output means and storage means.

The invention is of course not in any way restricted to the embodiments thereof described above, but many possibilities to modifications thereof would be apparent to a man with ordinary skill in the art without departing from the basic idea of the invention as defined in the appended claims.

The invention claimed is:

1. A control system for controlling the movements of a plurality of mechanical units, the control system comprising:
    a program unit comprising a plurality of mechanical unit programs, each mechanical unit program comprising program instructions including movement instructions for at least one of said mechanical units,
    a plurality of path planners operatively connected to the program unit and to the mechanical units, each path planner adapted to receive movement instructions from at least one of said mechanical unit programs and based on the movement instructions determine how the mechanical unit should move in order to be able to execute the movement instructions, wherein at least one of said path planners is adapted to receive movement instructions from at least two of said mechanical unit programs and based on the movement instructions determine how the mechanical units should move in order to synchronize movements of the mechanical units, and
    a switch unit operatively connected to the program unit and the path planners, the switch unit being adapted to switch a mechanical unit program from one path planner to another path planner, such that the movements of the mechanical units are synchronized when the mechanical unit programs are connected to a same path planner and the movements of the mechanical units are independent when the mechanical unit programs are connected to different path planners.

2. The control system according to claim 1, wherein each mechanical unit program is connected to one of said path planners, and wherein said switch is adapted to upon command disconnect the mechanical unit program from the connected path planner and to connect the mechanical unit program to another path planner.

3. The control system according to claim 1, further comprising:
    a central data storage unit operatively connected to the mechanical units, wherein at least one of said mechanical units is arranged to transmit data concerning at least one of a position or a status of the at least one mechanical unit to the central data storage unit.

4. The control system according to claim 3, wherein said at least one mechanical unit is arranged to transmit at least one of position or status data to the central data storage unit when the at least one mechanical unit is stationary.

5. The control system according to claim 4, wherein said position data comprises information concerning at least one of a displacement or a rotation of a coordinate system of said at least one mechanical unit.

6. The control system according to claim 3, wherein said at least one mechanical unit is arranged to transmit at least one of position or status data to the central data storage unit while the at least one mechanical unit is moving to a new location.

7. The control system according to claim 3, wherein the central data storage unit is arranged so that data stored therein is accessible by an operator, a mechanical-unit program or the path planners.

8. The control system according to claim 3, wherein the central data storage unit is arranged so that data stored therein is accessible via a network.

9. The control system according to claim 1, wherein the control system comprises a plurality of mechanical units comprising robots and/or external axes, which are programmed to execute at least one task where at least two of said mechanical units move synchronously.

10. A method for controlling the movements of a plurality of mechanical units, the method comprising:
   storing in a program unit a plurality of mechanical unit programs, each mechanical unit program comprising program instructions including movement instructions for one of said mechanical units,
   storing at least one of position or status data from at least one of the plurality of mechanical units in a central data storage unit,
   connecting said program unit and said mechanical unit programs to a plurality of path planners so that at least two of the mechanical unit programs are connected to different path planners, wherein each of said at least two path planners receives instructions from the connected mechanical unit program and based on the movement instructions determines how the mechanical unit should move in order to be able to execute the movement instructions of the program, and
   switching at least one of the mechanical unit programs to another path planner so that more than one of the mechanical unit programs is connected to a same path planner, which receives instructions from the connected mechanical unit programs and based on the received instructions determines how the mechanical units should move in order to synchronize movements of the mechanical units.

11. The method according to claim 10, further comprising:
   connecting each mechanical unit program to one of said path planners,
   upon command disconnecting at least one of the mechanical unit programs from the connected path planner, and
   connecting the mechanical unit program to another path planner.

12. A computer program product, comprising:
   a computer readable medium; and
   computer program instructions recorded on the computer readable medium for making a computer or processor execute a method comprising
   storing a plurality of mechanical unit programs, each comprising program instructions including movement instructions for one of said mechanical units,
   connecting said mechanical unit programs to a plurality of path planners so that at least two of the mechanical unit programs are connected to different path planners, wherein each of said at least two path planners receives instructions from the connected mechanical unit program and on basis thereof determines how the mechanical unit should move in order to be able to execute the movement instructions of the program, and
   switching at least one of the mechanical unit programs to another path planner so that more than one of the mechanical unit programs are connected to the same path planner, which receives instructions from the connected mechanical unit programs and on basis thereof determines how the mechanical units should move in order to synchronize their movements.

13. The computer program product according to claim 12, wherein the system comprises a plurality of mechanical units comprising robots and/or external axes, and wherein the computer program instructions include executing at least one task and synchronously moving at least two of said mechanical units.

14. A method for controlling the movements of a system comprising a plurality of mechanical units, wherein the mechanical units comprise at least one of robots or external axes, the method comprising:
   storing in a program unit a plurality of mechanical unit programs, each mechanical unit program comprising program instructions including movement instructions for one of said mechanical units,
   connecting said program unit and said mechanical unit programs to a plurality of path planners so that at least two of the mechanical unit programs are connected to different path planners, wherein each of said at least two path planners receives instructions from the connected mechanical unit program and based on the movement instructions determines how the mechanical unit should move in order to be able to execute the movement instructions of the program,
   switching at least one of the mechanical unit programs to another path planner so that more than one of the mechanical unit programs is connected to a same path planner, which receives instructions from the connected mechanical unit programs and based on the received instructions determines how the mechanical units should move in order to synchronize movements of the mechanical units,
   programming the mechanical units to execute at least one task, and
   synchronously moving at least two of said mechanical units.

* * * * *

UNITED STATES PATENT AND TRADEMARK OFFICE
CERTIFICATE OF CORRECTION

PATENT NO. : 7,620,478 B2  Page 1 of 1
APPLICATION NO. : 10/585726
DATED : November 17, 2009
INVENTOR(S) : Fortell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twenty-sixth Day of October, 2010

David J. Kappos
*Director of the United States Patent and Trademark Office*